March 29, 1966    E. A. COLE, JR    3,243,474
RECYCLE ALKYLATION PROCESS UTILIZING AN ELECTRIC FIELD
Filed Sept. 17, 1963    3 Sheets-Sheet 1
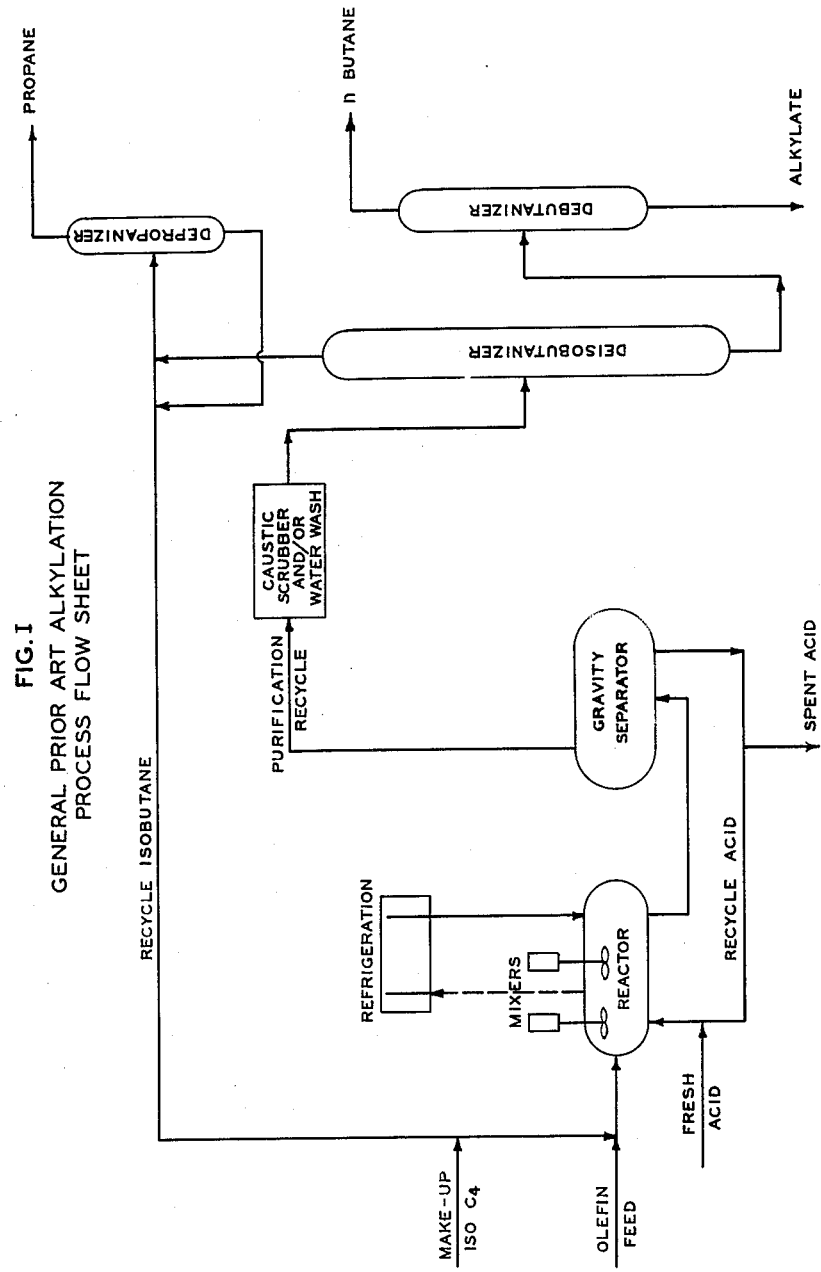
FIG. I
GENERAL PRIOR ART ALKYLATION PROCESS FLOW SHEET

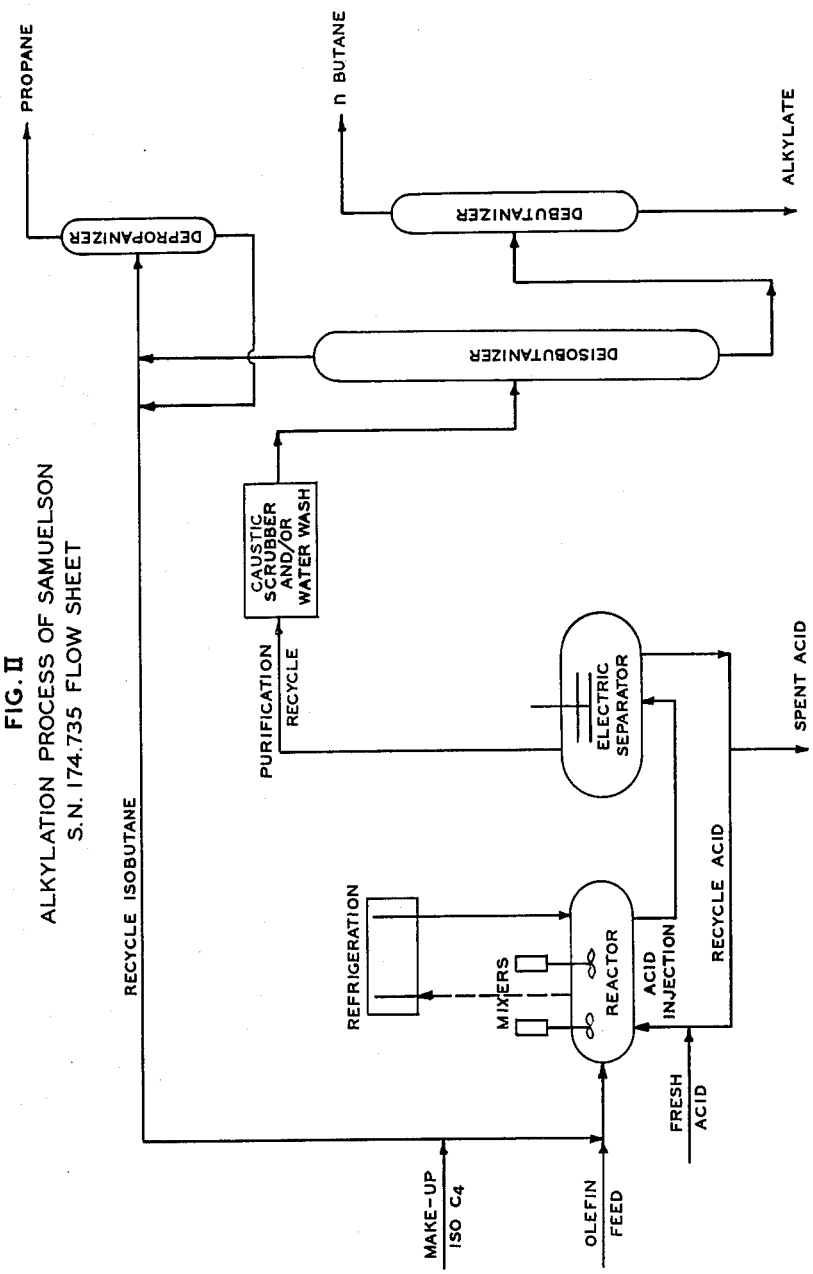

March 29, 1966     E. A. COLE, JR     3,243,474
RECYCLE ALKYLATION PROCESS UTILIZING AN ELECTRIC FIELD
Filed Sept. 17, 1963     3 Sheets-Sheet 3
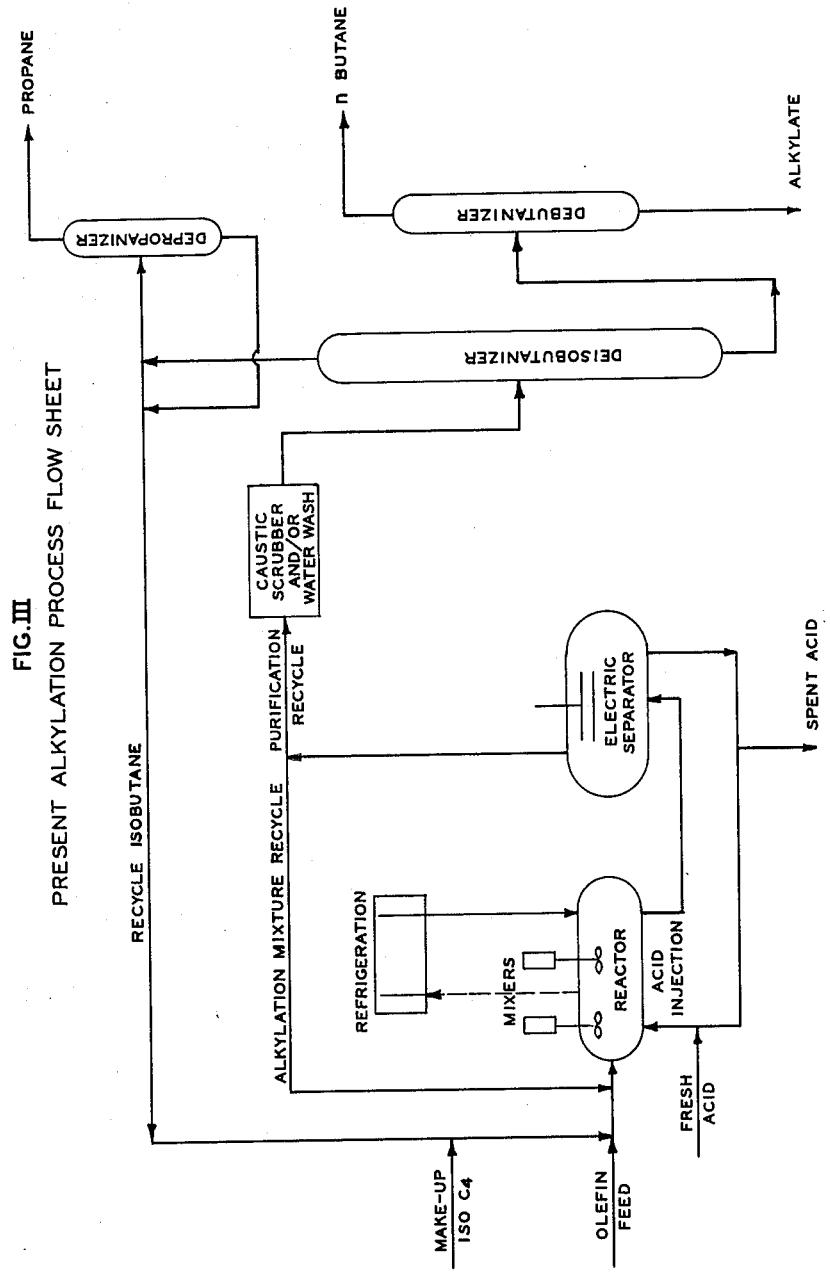
FIG. III
PRESENT ALKYLATION PROCESS FLOW SHEET United States Patent Office 3,243,474
Patented Mar. 29, 1966

3,243,474
RECYCLE ALKYLATION PROCESS UTILIZING AN ELECTRIC FIELD
Ernest A. Cole, Jr., Houston, Tex., assignor to Petrolite Corporation, Wilmington, Del., a corporation of Delaware
Filed Sept. 17, 1963, Ser. No. 309,471
8 Claims. (Cl. 260—683.46)

This invention relates to a process of alkylation. This invention also relates to a process of alkylating hydrocarbons to produce an alkylate used as an important constituent of high octane gasoline.

The advantages of this invention will become apparent from the description herein given and by examination of the drawings in which:

FIGURE I is a typical alkylation process flow sheet of the prior art.

FIGURE II is a representative alkylation process flow sheet employing an electric field as described in Samuelson's application Serial No. 174,735.

FIGURE III is a representative alkylation process flow sheet of the present invention.

Alkylation processes include the alkylation of paraffins, isoparaffins, aromatic compounds, cycloaliphatic compounds, etc. with olefins. The alkylation reaction may take place over a wide range of temperatures ranging from below 0° F. when alkylating isoparaffins to as high as about 600° F. when certain aromatic compounds are reacted with olefins. It may be conveniently carried out under pressures at or below atmospheric or as high as several hundred atmospheres.

The major alkylation process in use today involves the reaction of isoparaffins with olefins in the presence of an acid catalyst to form valuable high octane gasoline components. The isoparaffins used may be isobutane, isopentane, isohexane, etc., or mixtures thereof. Olefins more often reacted are propylenes, butylenes, pentylenes, their isomers, and mixtures thereof. In addition, one may utilize any proportions of the above as feed stocks as well as mixtures of isoparaffins and olefins with or without the presence of normal paraffins.

Various methods of preparing high octane alkylates by reacting olefins with paraffins, such as isoparaffins, are known. These methods include liquid phase catalytic alkylations with (1) hydrogen fluoride and (2) concentrated sulfuric acid. In general these methods are carried out by adding an olefin to an excess of an isoparaffin hydrocarbon emulsified in the catalyst. Excess isoparaffin is separated after alkylation and recirculated. Sufficient pressure is employed during the process to keep the reactants in the liquid phase. Higher temperatures can be employed with HF, such as 70–115° F., but lower temperatures for example 30–50° F. are employed with $H_2SO_4$ to suppress side reactions.

In a typical commercial alkylation, isobutane and the acid catalyst are introduced into an alkylation reaction zone, and are violently agitated to form an emulsion, this being the preferred method of assuring intimate contact between the acid catalyst and the hydrocarbon to be alkylated. Inasmuch as the reaction occurs at the liquid-liquid interface, it is necessary to provide violent agitation and intimate contact if the desired reaction is to take place. The major portion of the isobutane feed is provided by a recycle stream obtained from subsequent distillation steps; any additional quantity of isobutane required, for example that amount needed to start up the unit, is usually supplied from an independent source. The agitation may be provided in a number of ways. Usually a conventional mixer or pump provides a means for creating and moving the emulsion at high velocity and also for circulating the emulsion in the contact zone. The alkylation reaction may be carried out in one step, although more usually several steps in series are provided, with a portion of the olefin reactant being admitted to each stage and contacting isobutane passing serially through the successive stages. The alkylation feed which contains olefin reactant also contains isobutane, butylene, propane, propylene, and frequently small quantities of lighter paraffins. The temperature in the reaction zone is maintained at a constant low level by vaporizing therefrom the lighter components in the reaction products, more usually a mixture of butane, isobutane, propane, and any lower boiling compounds. Because of the high concentration of isobutane in the reactor liquid these vapors are predominantly isobutane. The vapors are compressed and condensed, and the condensate after the removal of propane and the lighter components is returned to the alkylation reaction zone in the isobutane recycle. In addition or alternatively external mechanical or absorption refrigeration can be employed.

The alkylation mixture leaving the last reaction stage, comprising a mixture of alkylate, acid and unreacted hydrocarbons, passes into a settling zone wherein contaminated acid catalyst, containing polymers and other impurities, is separated from the alkylate and unreacted isobutane. A portion of the contaminated acid is recycled to the contacting zone and the remainder is either purified for reuse, used in another process where a high degree of purity is not required, or is discarded. Alkylate and unreacted isobutane are further processed to separate the alkylate, and the isobutane is recycled to the contacting zone.

Certain alkylation systems charge commercial mixtures of paraffins and commercial mixtures of olefins which consist primarily of paraffins and olefins having about 3–6 carbon atoms, for example propylene and/or propane, butenes and/or butanes, pentenes, and/or pentanes, hexanes and/or hexenes, isomers thereof, etc.

In commercial processes of alkylation the ratio of isoparaffin to olefin is kept high in order to increase the alkylation of the olefin and to suppress polymerization of the olefin. Excess isoparaffin is purified and separated after alkylation and then recycled.

A representative commercial process of this type is shown in FIGURE I. In this process, after the separation of the acid, the hydrocarbon product is scrubbed with caustic and/or water and the resulting product separated into alkylate and volatile fractions from which isobutane is recycled. Since large excesses of isobutane are employed, large separation and distillation equipment must be employed which increases the cost of alkylation. Stated another way, because of the large excess of isoparaffin employed, it is necessary to recycle the isoparaffin to maximize yields. However, if the alkylation mixture is recycled without fully removing sulfuric acid from the hydrocarbon mixture, side reactions occur since reaction continues as long as sulfuric acid is present therein. Since separation is affected in a typical commercial operation by gravitation, removal of the acid from the hydrocarbon phase is slow and incomplete. In order to maximize the yield of desired product, contact time must be short. In order to achieve this, it is necessary to remove sulfuric acid after the desired reaction time exposure is completed, such as by means of settling and caustic and/or water scrubbing. Thereupon, the alkylate is separated from the volatile components and isobutane is recycled. Because of the large excesses of isobutane employed, a large investment in separation and distillation equipment is required.

A disadvantage of such processing in the prior art is the requirement for massive volumes of catalyst; for example, the catalyst occupies 35–60% of the volume of the reactor. Since the catalyst in the case of sulfuric acid is not as effective when it becomes diluted to 90%, the industry is faced with a huge sulfuric acid disposal or regeneration problem which is both expensive and burdensome. Such massive volumes of catalyst require larger reaction vessels than would be employed if smaller amounts of catalyst could be employed. In addition, massive volumes of sulfuric acid tend to promote side reactions. Often the emulsions formed are hard to break upon completion of the reaction so that reaction contact time cannot be fully controlled.

In application S.N. 174,735 to Samuelson there is described a method of alkylation which avoids the problems associated with the use of massive volumes of alkylation catalyst and the absence of emulsion breaking control which comprises reacting an olefin with an isoparaffin in the presence of a dispersed catalyst wherein the hydrocarbon phase is the continuous phase of said dispersion; and then subjecting the resulting product to an electric field. Samuelson's process uses substantially less acid by "making a little acid go a long way" since the acid now functions as a low volume rather than as a massive volume catalyst. This is effected by finely dispersing catalytic amounts of acid in the reaction medium, preferably in the isoparaffin so that the effective catalytic surface area of the acid, which effects reaction between the isoparaffin and the olefin, is maximized. However, the more dispersed the acid the more difficult is the final separation of the acid from the reaction mixture since finely divided particles do not readily settle on standing. By employing an electric field in conjunction with these fine dispersions of acid, the reaction time is more readily controlled since the application of an electric field, by effecting removal of the catalyst, stops the reaction and thus minimizes undesirable side reactions. In addition, rapid removal of the catalyst by the electric field decreases the time required to allow the catalyst to settle, permitting faster throughput. Thus, Samuelson's process permits the advantages of a finely dispersed catalyst without the disadvantages associated therewith since an electric field solves demulsification problems generally inherent in a system containing finely dispersed particles.

Thus, Samuelson's process (1) requires lesser volumes of sulfuric acid, (2) requires a smaller reactor, (3) results in fewer side reactions during alkylation, (4) reduces the disposal problem associated with larger volumes of spent sulfuric acid since lesser amounts of catalyst yield greater amounts of alkylate as compared to prior processes, etc. and (5) facilitates demulsification upon completion of the reaction.

In its broadest aspects, Samuelson's invention relates to an alkylation process characterized by (1) a dispersion or emulsion of alkylation catalyst in the hydrocarbon phase so that a hydrocarbon continuous phase is maintained in the system and (2) the treatment of said hydrocarbon continuous system with an electric field upon completion of alkylation.

I have now discovered that by the use of an electric field the alkylation mixture can be recycled after electrical treatment without being purified as in previous processes. In practice the alkylation mixture after being electrically treated to separate the acid, is proportioned so that the major proportion thereof is directly recycled into the alkylation reactor and a minor proportion thereof is separated and fractionated in the conventional manner before returning isobutane to the reaction. In this way capital investment in large and expensive separation and distillation equipment is reduced since the greater part of the hydrocarbon phase of the alkylation mixture is recycled without purification.

The essential differences between (1) the general processes of the prior art (FIGURE I) (2) the general process of Samuelson application S.N. 174,735 (FIGURE II) and (3) the present invention (FIGURE III) are shown in the respective drawings specified above. The differences are as follows:

(1) In the prior art processes, (a) the hydrocarbon layer is separated from the acid layer by gravity and (b) the hydrocarbon layer is not directly recycled to the reactor but is purified and separated such as by caustic and/or aqueous scrubbing, deisobutanizing, debutanizing, and depropanizing prior to recycling the isobutane into the reactor. In other words, the hydrocarbon phase of the alkylation mixture recycle of the present invention is omitted. Furthermore, the separator employed in the prior art is a gravity separator.

(2) In the general process of Samuelson S.N. 174,735, the process is carried out in a manner similar to FIGURE I except that an electrical separator is employed.

(3) The process of the present invention employs an electrical separator and an electrically treated alkylation mixture recycle.

The present invention may be described by referring to FIGURE III which presents a flow diagram of the alkylation process as practiced by this invention which is presented for purposes of illustration and not of limitation.

EXAMPLE

In FIGURE III the isoparaffin, such as isobutane, an olefin such as isobutylene and 98% sulfuric acid are pumped into a reactor in metered proportions where the acid is finely dispersed in the isobutane-isobutylene phase. The reaction is carried out at 20 to 85° F., for example 35 to 70° F., but preferably 50 to 60° F. In practice temperatures of 50–55° F. are generally employed.

Dispersion of the catalyst in the hydrocarbon phase can be achieved by any suitable means such as for example circulating pumps, jet injectors, agitating and circulating devices, etc., as well as more drastic dispersing means such as ultrasonics, colloidal mills, etc. High voltage electric fields can also be employed to create the emulsions or dispersions. Dispersions may be effected prior to entrance into the reactor vessel or they may be effected in the reactor, as shown in FIGURE III. For example the acid can be emulsified or dispersed in the isoparaffin prior to entrance in the reaction vessel.

The agitation should be sufficient to produce a finely divided emulsion or dispersion which will be stable until it is desired to separate the hydrocarbon and catalyst phases at the conclusion of the reaction. Increased agitation generally improves the results obtained, and the ultimate limit in this regard will be determined by economic considerations, in view of the power consumption required to improve agitation sufficiently to effect an improvement in yield or quality of the alkylate and the difficulties which may be encountered in separating a very finely divided and relatively stable emulsion. Since an electrostatic field can break a "tight emulsion," very fine dispersions can be used.

The temperature of the reaction is controlled by any desired means such as by precooling the reactants and acid and internal cooling in the reaction by the evaporation and recondensation of low boiling gas such as propane butane, and isobutane as shown in FIGURE III.

The molar ratio of isobutane to isobutylene should be in as large excess as possible so as to minimize side reactions, theoretically as high as 2000 or greater. However, in practice and because of economic considerations, ratios lower than 100 such as from about 15 to a ratio of about 3, for example 10 to 5, but preferably about 9 to 6 are employed.

Since a little acid goes a long way, and fine dispersions increase the surface area of the acid, relatively little acid as compared to the prior art process is employed, for example from about 3 to 50 volumes or more of acid per 100 volumes of hydrocarbon, advantageously 5 to 30 volumes, but preferably 10 to 20 volumes. However, regardless of volume ratios employed, the emulsion or dispersion formed should be hydrocarbon continuous, at least when in contact with the electric field.

The alkylation reaction is initiated upon introduction of the sulfuric acid into the reactor. It is desirable to provide sufficient agitation of the alkylation mixture in the reactor to maintain the acid catalyst in a fine state of subdivision most favorable, because of a large catalyst-isobutane surface area, to the alkylation reaction. Such agitation can be provided by conventional mixing devices which employ internal or external recirculation, such as the stirrers shown in FIGURE III.

The residence time in the alkylation reactor is sufficient to accomplish substantially complete conversion of the isobutylene to alkylate, generally not exceeding about 20–30 minutes and preferably not exceeding about 5–10 minutes, and most preferably not exceeding five minutes such as from 1–4 minutes.

From the alkylation reactor the alkylation mixture, which now comprises alkylated product, unreacted hydrocarbons, and acid materials, all in intimate admixture, is now passed into the electric treater where it is subjected to an electric field of sufficient voltage to separate rapidly the acid catalyst therefrom. Voltages capable of effecting this will vary depending on many variables. Voltage gradients employed are in the range of about 1–50 kv., based on 1 inch electrode spacing, such as about 5–25 kv./in., for example about 8–20 kv./in. but preferably about 10–15 kv./in. Both alternating and direct currents can be employed, but preferably direct current. A wide variety of electric treaters can be employed, for example those disclosed in U.S. Patent 2,897,251, 2,976,228 and elsewhere.

By means of the electric field, the acid and hydrocarbons are separated into two phases, hydrocarbon (upper) and acid (lower). The bulk of the acid is returned to reactor while a portion of the acid is withdrawn from the system as spent acid.

After leaving the electric separator, the hydrocarbon phase which is separated from the acid phase is proportionated so that part thereof is directly recycled into the reactor and the remainder is treated so as to remove traces of residual acid from the product such as by means of a caustic scrubber and/or water wash. The acid-free product is then deisobutanized, depropanized and debutanized to separate isobutane (which is recycled as shown in FIGURE III), propane, butane, and alkylate.

The weight ratio of electrically treated alkylation mixture which is recycled to that which is separated prior to recycling as isobutane is determined by practical considerations. Any desired ratio can be employed such as from about 100:1 or greater to about 1:100 or less, such as from 70:1 to 10:1, for example from about 50:1 to 30:1, but preferably about 20:1.

By directly recycling the electrically treated alkylation mixture without further purification, smaller separation, purification and distillation equipment are required thus resulting in a substantial reduction in capital investment and operational costs.

It should be noted that the emulsion need not be hydrocarbon continuous during all stages of the process but should be hydrocarbon continuous when it enters the electric field. For example, the reaction mixture may be non-hydrocarbon continuous in the reactor but as it nears the electric field, the bulk of the acid may be removed by a weak electric field at the periphery of the electric treating zone. Thereafter the emulsion entering the electric treating area should be hydrocarbon continuous.

That part of product which has been proportionated for the purification recycle enters the caustic scrubber and/or water wash where the small amounts of acid remaining in the hydrocarbons are neutralized with aqueous alkali and/or water. The hydrocarbons, after being washed, enter the deisobutanizer wherein the unreacted hydrocarbons are separated from the alkylated products and butane by distillation. The lighter unreacted hydrocarbons pass to the depropanizer wherein propane is separated by distillation from isobutane. Isobutane is recycled into the reactor to which make-up isobutane is added. The heavier fraction from the deisobutanizer is then transferred to the debutanizer wherein n-butane is separated from alkylate.

I have found that by employing a very effective electrical treater in the process, the scrubber employing a caustic and/or water wash may be omitted from the process. In other words in certain instances where an effective electric treater is employed scrubbing is optional.

If desired an electric field can be employed to separate aqueous caustic or water from the hydrocarbons prior to entering the deisobutanizer.

Data from specific runs carried out according to this invention are presented in the following table:

|  | Example | | |
|---|---|---|---|
|  | 1 | 2 | 3 |
| Run Conditions: |  |  |  |
| (1) Isobutane Rate, ml./min | 60 | 40 | 60 |
| (2) Olefin Rate, ml./min | 20 | 20 | 20 |
| (3) Olefin Feed, Type | Butenes | Butenes | Butenes |
| (4) Acid, Total Vol. percent of Emulsion | 12.0 | 12.0 | 12.0 |
| (5) Acid, Fresh Acid Concentration, wt. percent | 99.7 | 99.3 | 99.3 |
| (6) Acid, Ratio Recycle/Fresh Acid | 8.7 | 7.4 | 7.4 |
| (7) Contact Time, Emulsion Recycle, min | 1.5 | 1.5 | 1.5 |
| (8) Mixer Outlet Temperature, °F | 68 | 66 | 73 |
| (9) Emulsion Recycle Temperature, °F | 59 | 55 | 61 |
| (10) Treater Outlet Temperature, °F | 48 | 43 | 48 |
| (11) Treater Outlet Pressure, p.s.i.g | 38 | 40 | 40 |
| (12) Alkylation Mixture Recycle Rate, ml./min. (After electric treatment) | 400 | 360 | 360 |
| Materials Summary: |  |  |  |
| (1) Isobutane Charged, gms | 6,946 | 4,040 | 5,175 |
| (2) Butenes Charged, gms | 1,589 | 1,560 | 1,220 |
| (3) Alkylate Produced, ml | 3,884 | 3,856 | 2,826 |
| (4) Ratio, Alkylate/Olefin Chg., wt./wt | 1.7 | 1.7 | 1.6 |
| (5) Ratio, lb. Acid/gal. Alkylate | 0.44 | 0.38 | 0.23 |
| (6) Yield, Distill. to 400° F. end point | 93 | 91.7 | 92.8 |
| (7) Molar Ratio, iso $C_4$/olefin, external | 2.73 | 1.86 | 2.86 |
| (8) Molar Ratio, iso $C_4$/olefin, recycle | 10.3 | 8.0 | 11.6 |
| Analytical Data: |  |  |  |
| Alkylate: |  |  |  |
| (1) Specific Gravity at 60° F | .6986 | .6950 | .6977 |
| (2) Refractive Index at 25° C | 1.3950 | 1.3958 | 1.3951 |
| (3) Bromine Number° | 1.2 | 0.9 | 0.9 |
| (4) Residue at 400° F. Vol. percent | 3.5 | 4.0 | 3.4 |
| (5) Isopentane Content, wt. percent | 6.3 | 7.3 | 5.0 |
| (6) Ratio TMP/DMH = trimethyl pentane; dimethylhexane | 6.7 | 5.6 | 5.7 |
| (7) Octane Rating F-1 Research | 91.5 | 90.7 | 92.0 |
| Acid Sludge: |  |  |  |
| (1) Neutral Oils, Vol. percent | 12 | 16 | 16 |
| (2) Total Titratable Acidity, wt. percent | 96.5 | 87.3 | 89.9 |

The present invention is particularly applicable to the alkylation of isobutane with $C_3$, $C_4$, or $C_5$ olefins, or mixtures thereof, for the production of gasoline of high octane and quality. However, it is to be understood that the invention is applicable to the alkylation of any isoparaffin with any olefin. Thus, the isoparaffin may be isobutane, isopentane or isohexane. The olefin may be propylene, butylenes, pentylenes, hexylenes, other higher boiling monomeric olefins or certain selected fractions of cracked naphthas, olefin polymers such as di-isobutylene, tri-isobutylene, co-polymers of isobutylene and normal butylene such as the co-dimer, and various mixed polymers.

While the present invention has been described above as applying particularly to the use of sulfuric acid as catalyst, it is to be understood that any other suitable and conventional alkylation catalyst can be employed, such as hydrofluoric acid, phosphoric acid, aluminum chloride-hydrocarbon complex, $BF_3 \cdot H_2O$, chlorosulfonic acid, fluorsulfonic acid and the like. The operating conditions for these catalysts are well-known, and conventional conditions coupled with the features of the present invention as set forth above may be used.

Moreover, the present invention is applicable to the alkylation of any organic compound having a readily replaceable hydrogen atom with any suitable alkylating agent. As stated above, the invention is of particular importance in the alkylation of an isoparaffin or other paraffin hydrocarbon having a tertiary carbon atom in the molecule, to enable a superior quality to be produced in large capacity. But the principles of the present invention are applicable to the alkylation of a normal paraffin, a naphthene or cycloparaffin, and an aromatic hydrocarbon, as well as or instead of the isoparaffin. In place of an olefin as the alkylating agent, various alkyl esters, such as the sulfates, chlorides, fluorides, etc. may be used. For example, the present invention can be employed in a two-stage absorption-alkylation process, wherein the olefin is absorbed in acid in the first stage to produce the corresponding alkyl ester, and the ester either in solution in the absorbing acid or after separation therefrom as by isobutane or alkylate extraction, is then alkylated in the second stage in accordance with the present invention. Moreover, various aliphatic alcohols and ethers which are capable of forming olefins on reaction, such as tertiary butyl alcohol, isopropyl alcohol, butyl ether, etc. may be employed as the alkylating agent, particularly with catalysts which have tolerance for water liberated in the reaction.

The term "alkylatable compound" relates to any organic compound having a replaceable hydrogen atom which can be alkylated with an olefin or other suitable alkylating agent. The term "alkylating agent" relates to a material such as an olefin or its equivalent which is capable of alkylating said alkylatable compound. The term "alkylation catalyst" refers to an agent capable of effecting reaction between the alkylating agent and the alkylatable compound. The term "alkylation mixture" refers to the reaction product following alkylation. The reaction may be summarized as follows:

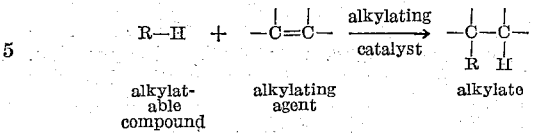

It is not intended that this invention be limited to the specific embodiments presented and described herein as many modifications thereof are possible without departing from the scope and spirit of the invention. The principle of this invention wherein an electric field is applied to an oil continuous dispersion of an alkylation catalyst in the alkylation mixture and the recycling of the alkylation mixture after electric treatment is applicable generally to the broad scope of the alkylation reaction.

Having thus described my invention, what I claim as new and desire to obtain by Letters Patent is:

1. A process of alkylation which is characterized by forming a hydrocarbon continuous dispersion of an alkylation catalyst in an alkylation mixture, subjecting said hydrocarbon continuous dispersion of an alkylation catalyst in the alkylation mixture to an electric field, said electric field simultaneously causing rapid removal of said catalyst and stoppage of said alkylation process, said alkylation process continuing until said simultaneous rapid removal and stoppage by said electric field, said process minimizing undesirable side reactions and permitting faster throughput, and recycling the electrically treated alkylation mixture.

2. The process of claim 1 where the alkylation catalyst is sulfuric acid.

3. The process of claim 1 wherein the alkylation mixture contains isoparaffin as the alkylatable compound and an olefin as the alkylating agent.

4. The process of claim 3 wherein the alkylation catalyst is sulfuric acid.

5. The process of claim 3 wherein the isoparaffin is isobutane and the olefin is isobutylene.

6. The process of claim 5 wherein the alkylation catalyst is sulfuric acid.

7. The process of claim 1 wherein the alkylation mixture is a commercial mixture of paraffins as the alkylatable compounds and a commercial mixture of olefins as the alkylating agents, each of said paraffins and each of said olefins having 3–6 carbon atoms.

8. The process of claim 7 wherein the alkylation catalyst is sulfuric acid.

No references cited.

ALLEN B. CURTIS, *Primary Examiner.*

WINSTON A. DOUGLAS, *Examiner.*

B. J. OHLENDORF, *Assistant Examiner.*